(12) United States Patent
Stafford

(10) Patent No.: US 11,398,967 B1
(45) Date of Patent: Jul. 26, 2022

(54) LEAKAGE DETECTION ON HYBRID FIBER-COAXIAL (HFC) ACCESS NETWORKS

(71) Applicant: Charter Communications Operating, LLC, St. Louis, MO (US)

(72) Inventor: Roger Stafford, Thornton, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 17/195,566

(22) Filed: Mar. 8, 2021

(51) Int. Cl.
*H04L 43/12* (2022.01)
*H04L 12/28* (2006.01)

(52) U.S. Cl.
CPC .......... *H04L 43/12* (2013.01); *H04L 12/2801* (2013.01)

(58) Field of Classification Search
CPC ............................ H04L 43/12; H04L 12/2801
USPC ......................................................... 375/222
See application file for complete search history.

(56) References Cited

U.S. PATENT DOCUMENTS

| 7,792,963 | B2 | 9/2010 | Gould |
| 2003/0056217 | A1 | 3/2003 | Brooks |
| 2006/0130107 | A1 | 6/2006 | Gonder et al. |
| 2007/0217436 | A1 | 9/2007 | Markley |
| 2009/0248794 | A1 | 10/2009 | Helms |
| 2010/0313236 | A1 | 12/2010 | Straub |
| 2011/0043640 | A1* | 2/2011 | Zinevich ............ H04N 21/4382 348/192 |
| 2017/0366983 | A1* | 12/2017 | Gunasekara .......... H04W 24/08 |
| 2018/0294837 | A1* | 10/2018 | Chapman ............... H04B 3/487 |

OTHER PUBLICATIONS

Chrostowski et al., "Leakage in a High Split World Detecting and Measuring Upstream Leakage Levels in a One Gpbs Symmetrical High Split Hybrid Fiber Coax Network," Cable-Tex Expo, Oct. 12, 2020, pp. 1-38.

* cited by examiner

*Primary Examiner* — Kevin M Burd
(74) *Attorney, Agent, or Firm* — Otterstedt & Kammer PLLC

(57) ABSTRACT

A method for signal leakage detection includes initializing a leakage probe by providing information about a tone to a plurality of nodes of a network, instructing a first modem connected to a first one of the nodes to generate the tone, instructing a set of the nodes to listen for the tone outside of the network according to the information about the tone, receiving, from the set of nodes, information about a plurality of detections of the tone outside of the network associated with a leakage of the tone from the network, and determining a location of the leakage of the tone from the network using the information about the detections of the tone.

26 Claims, 13 Drawing Sheets

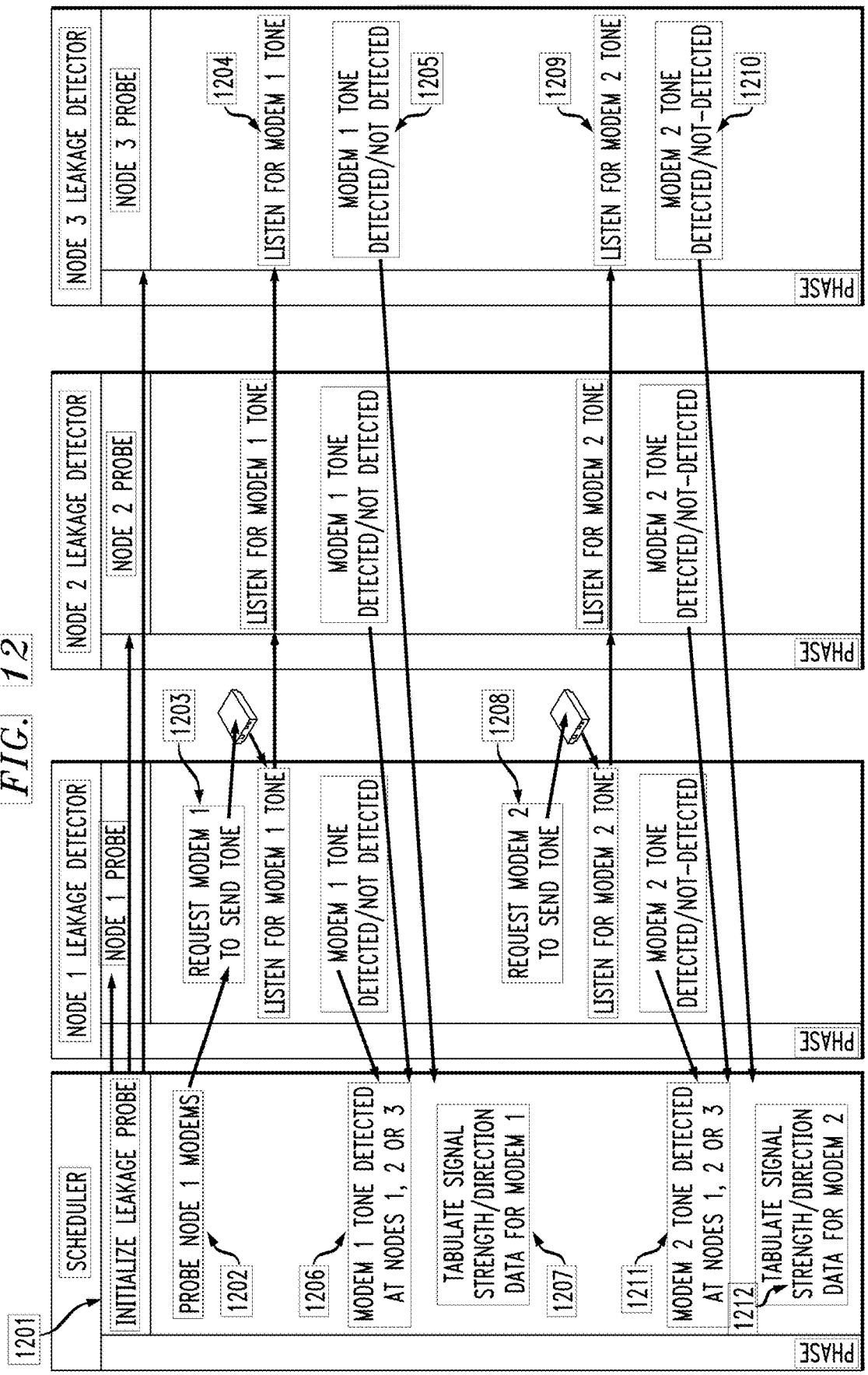

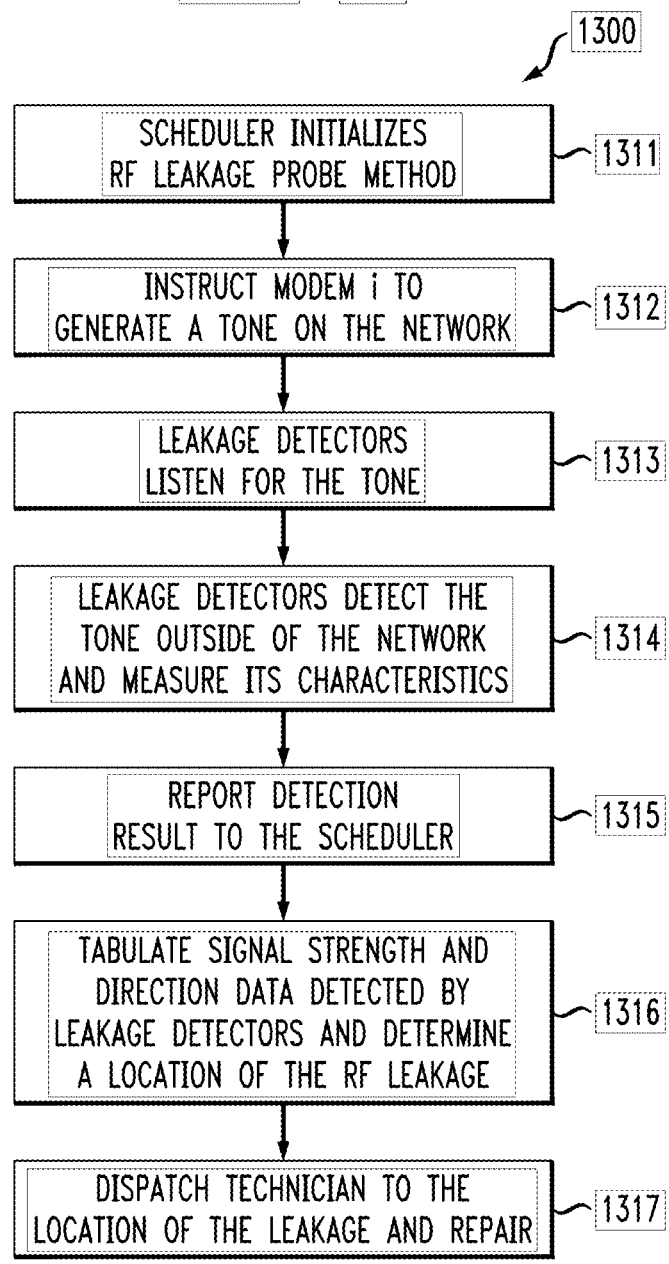

LEAKAGE DETECTION ON HYBRID FIBER-COAXIAL (HFC) ACCESS NETWORKS

FIELD OF THE INVENTION

The present invention relates generally to the electrical, electronic and computer arts, and, more particularly, to maintenance in broadband networks and/or video content networks, and the like.

BACKGROUND OF THE INVENTION

Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. There are also fiber networks for fiber to the home (FTTH) deployments (also known as fiber to the premises or FTTP), where the CPE is a Service ONU (S-ONU; ONU=optical network unit).

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville C O 80027, USA, and may be referred to at some points herein in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

Detecting radio frequency (RF) leakage is an on-going maintenance issue for cable and telecoms companies operating hybrid-fiber-coaxial cable plants because some radio bands are regulated by the Federal Communications Commission (FCC), National Telecommunications and Information Administration (NTIA) and Federal Aviation Administration (FAA) so that interference to some radio bands is protected from interference that would otherwise affect RF services.

The coaxial portion of an HFC network is by its nature a continuously radiating part of the network where any signals transmitted in either the upstream or downstream spectral band will leak to a very small degree. These are controlled and minimized with shielding and connectors that offer around 95 dB of attenuation, such that the resulting leakage is very, very small. However, cable shields and connectors become damaged due to stressors like wind, weather, and corrosion. When they simply become cracked or loose, radiation levels increase rapidly.

Leakage detection is mandated on cable companies so as not to accidentally cause interference into licensed bands used by other radio service operators such as the cellular, military and aviation bands. Cable companies are mandated to provide regular reporting on cable plant leakage levels. Since leakage is common from coaxial cabling within homes, from the overhead hardline, the coaxial drop cable infrastructure, etc., measurement of leakage levels is currently typically done by technicians driving around in specialized vehicles fitted with mobile receivers. When levels above a certain value are recorded, the operator homes in on the exact location and creates a service ticket for another crew to start a detailed search of the area, determine which cable and/or cable joint is leaking, and perform a repair.

The technician's drive-by measurements are aggregated into a report to the FCC. Additionally, the FCC mandates annual fly-over detection using aircraft carrying specialized receivers, which monitor cable-plant-generated noise in the band utilized by the aviation industry for air traffic control and pilot-to-pilot communications.

Traditional methods of leakage detection make use of a simple continuous wave tone inserted into an upstream or downstream portion of a broadcast spectrum (e.g., 5-1002 MHz). These insertions are typically done at a strategically important frequency bands, such as the civil aviation band between 108-137 MHz.

It can be difficult to detect fixed carriers, at least because a detector needs to be able to resolve the carrier above a background noise floor. This is possible only if the tone's amplitude is higher than the noise floor, such as occurs when the detector is close to the tone's point of egress from a break in the cable plant infrastructure.

SUMMARY OF THE INVENTION

Principles of the invention provide techniques for signal leakage detection. In one aspect, an exemplary method for signal leakage detection comprises initializing a leakage probe by providing information about a tone to a plurality of nodes of a network; instructing a first modem connected to a first one of the nodes to generate the tone; instructing a set of the nodes to listen for the tone outside of the network according to the information about the tone; receiving, from at least a detecting node of the set of nodes, information about the tone detected outside of the network associated with a leakage of the tone from the network; and determining information about the leakage of the tone from the network using the information about the tone detected.

In one aspect, an exemplary method for signal leakage detection includes initializing a leakage probe by providing information about a tone to a plurality of nodes of a network; instructing a first modem connected to a first one of the nodes to generate the tone; instructing a set of the nodes to listen for the tone outside of the network according to the information about the tone; receiving from the set of nodes information about a plurality of detections of the tone outside of the network associated with a leakage of the tone from the network; and determining a location of the leakage of the tone from the network using the information about the detections of the tone.

In one aspect, an exemplary system comprises a cable premises; a plurality of nodes connected to the cable premises by a plurality of mainlines, the nodes comprising a leakage receiver; and a plurality of modems connected to each of the plurality of nodes by a plurality of branches, wherein each of the nodes includes firmware having a scheduler configured to control the modems connected to respective ones of the branches to generate a modulated tone, and wherein the scheduler is configured to control the nodes to detect leakage of the modulated tone using the leakage receivers.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine-readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., see FIG. 11) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:

insertion of a modulated tone into a cable plant having detectors deployed on nodes deep into the field infrastructure reducing a detection distance and improving the CNR and reliability of detection;

a modulation scheme for a tone inserted into a cable plant that improves detectability of RF leakage;

reception of a (leaked) modulated tone by a single node;

correlation of a (leaked) tone detected by multiple nodes for improved spatial resolution;

selective insertion of a modulated tone into a cable plant, wherein the tone is locally enabled or disabled at each node;

modulated tones enabled at any frequency, and at multiple frequencies simultaneously, where positive detection of one modulated tone is simplified, and the modulated tone is positively identifiable by its modulation pattern (e.g., different tones having different patterns that form an identifier through embedded bit patterns).

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 12 is a timing-synchronization diagram showing a method of a leakage detection method in accordance with an example embodiment; and FIG. 13 is flow diagram showing a method of a leakage detection method in accordance with an example embodiment.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Embodiments of the present invention are related to apparatus, systems, and methods for insertion of modulated tones into a communications plant for leakage detection purposes, making radiation level measurements, and detecting RF leakage from the communications plant.

Figure 1:
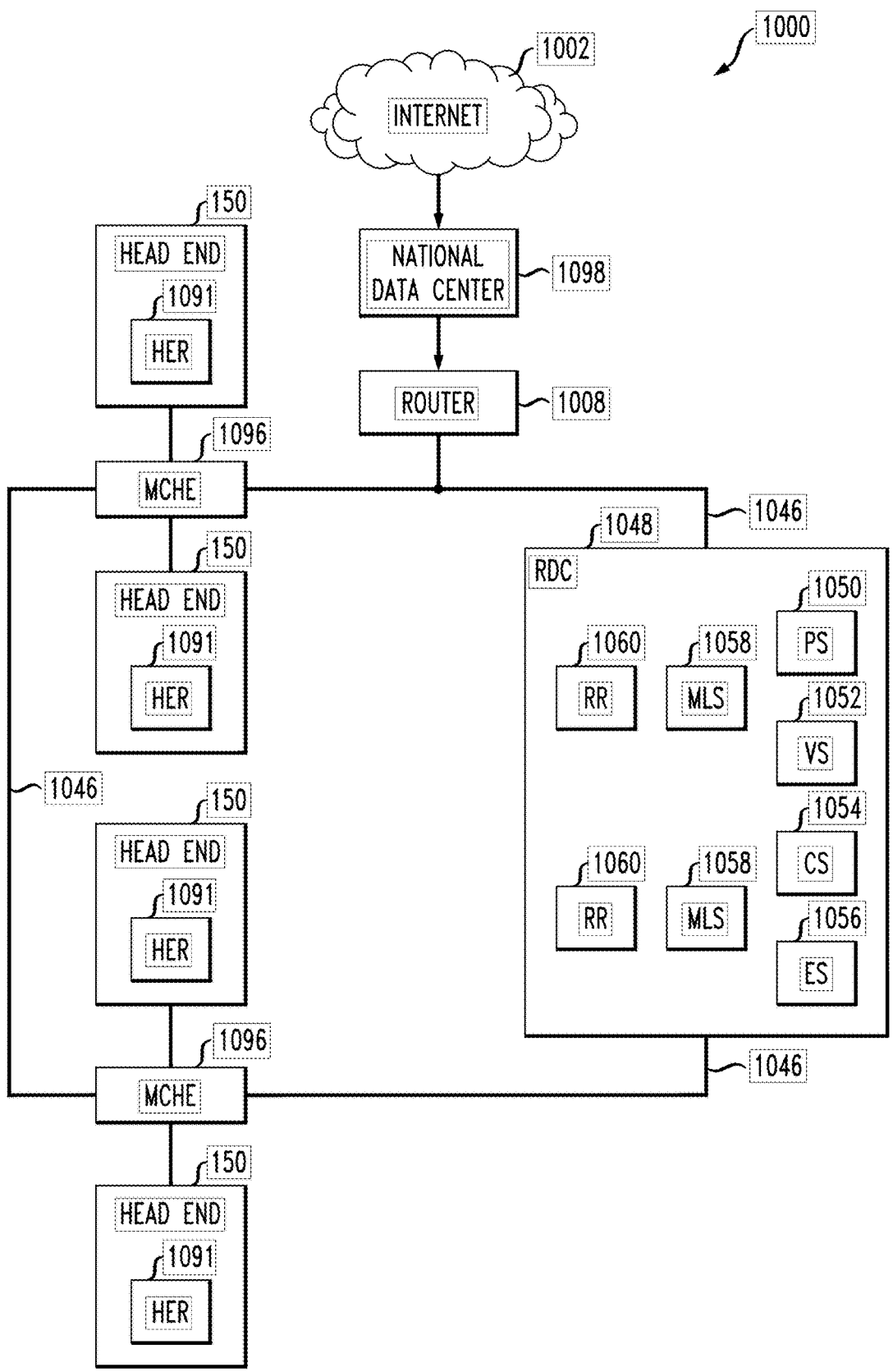
FIG. 1 is a block diagram of an exemplary embodiment of a system, within which one or more aspects of the invention can be implemented.

Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs)

1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area(s). In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
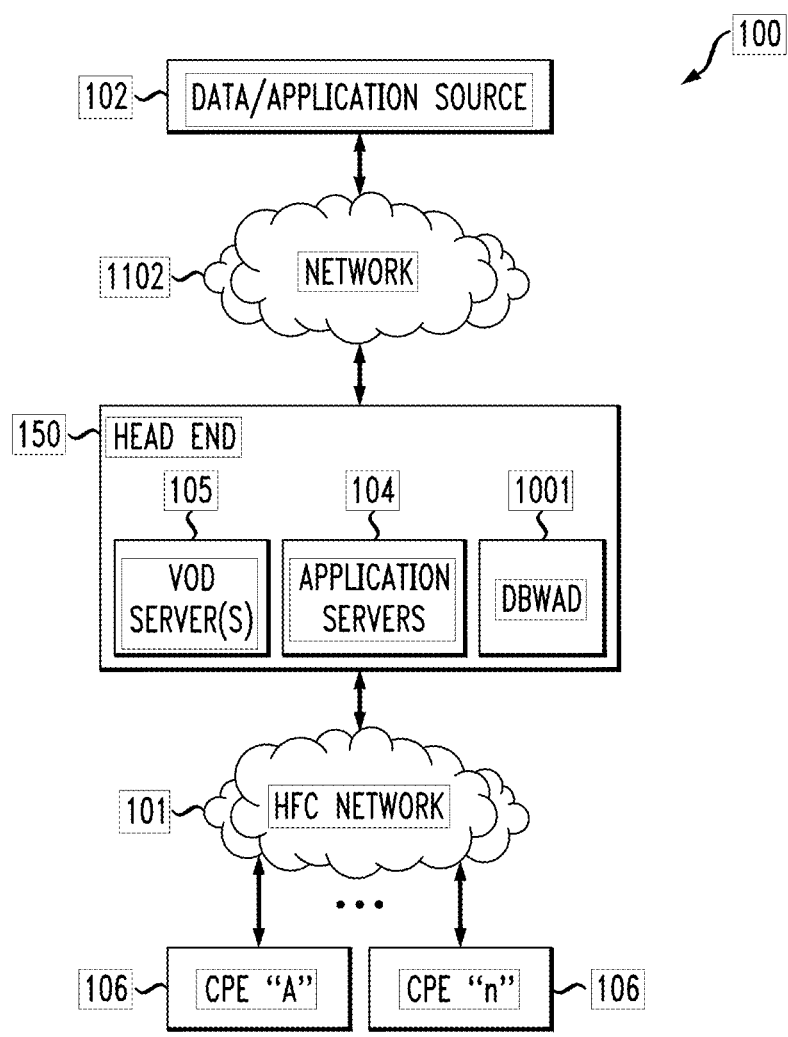
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ Service ONUs (S-ONUs; ONU=optical network unit) as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third-party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g., FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
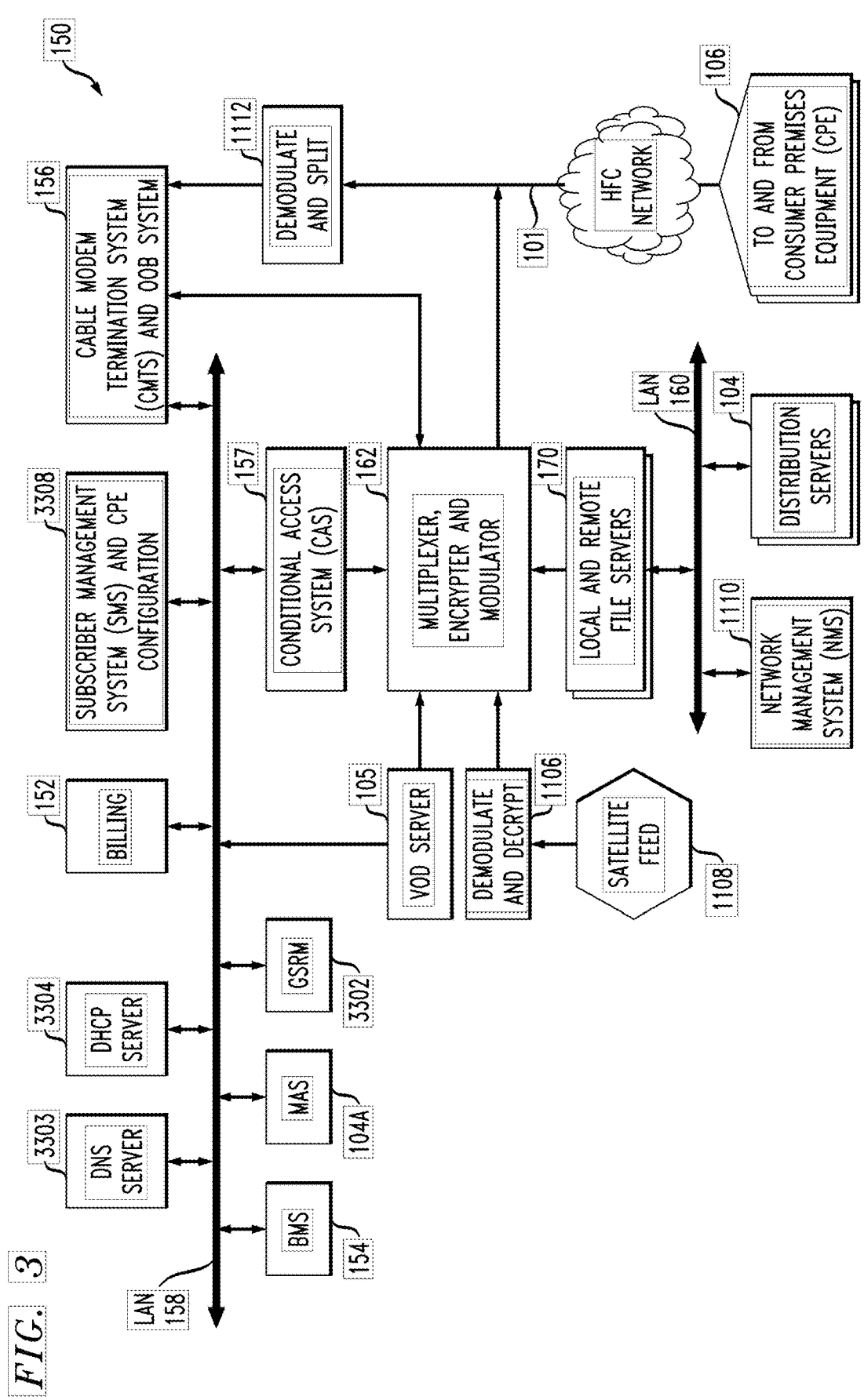
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville C O 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. HFC systems using DOCSIS to transmit data are one non-limiting exemplary application context for one or more embodiments. However, one or more embodiments are applicable to a variety of different kinds of networks.

It is also worth noting that the use of DOCSIS Provisioning of EPON (Ethernet over Passive Optical Network) or "DPoE" (Specifications available from CableLabs, Louisville, Co., USA) enables the transmission of high-speed data over PONs using DOC SIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

It should be noted that the exemplary architecture in FIG. 3 shows a traditional location for the CMTS 156 in a head end. As will be appreciated by the skilled artisan, CMTS functionality can be moved down closer to the customers or up to a national or regional data center or can be dispersed into one or more locations.

Figure 4:
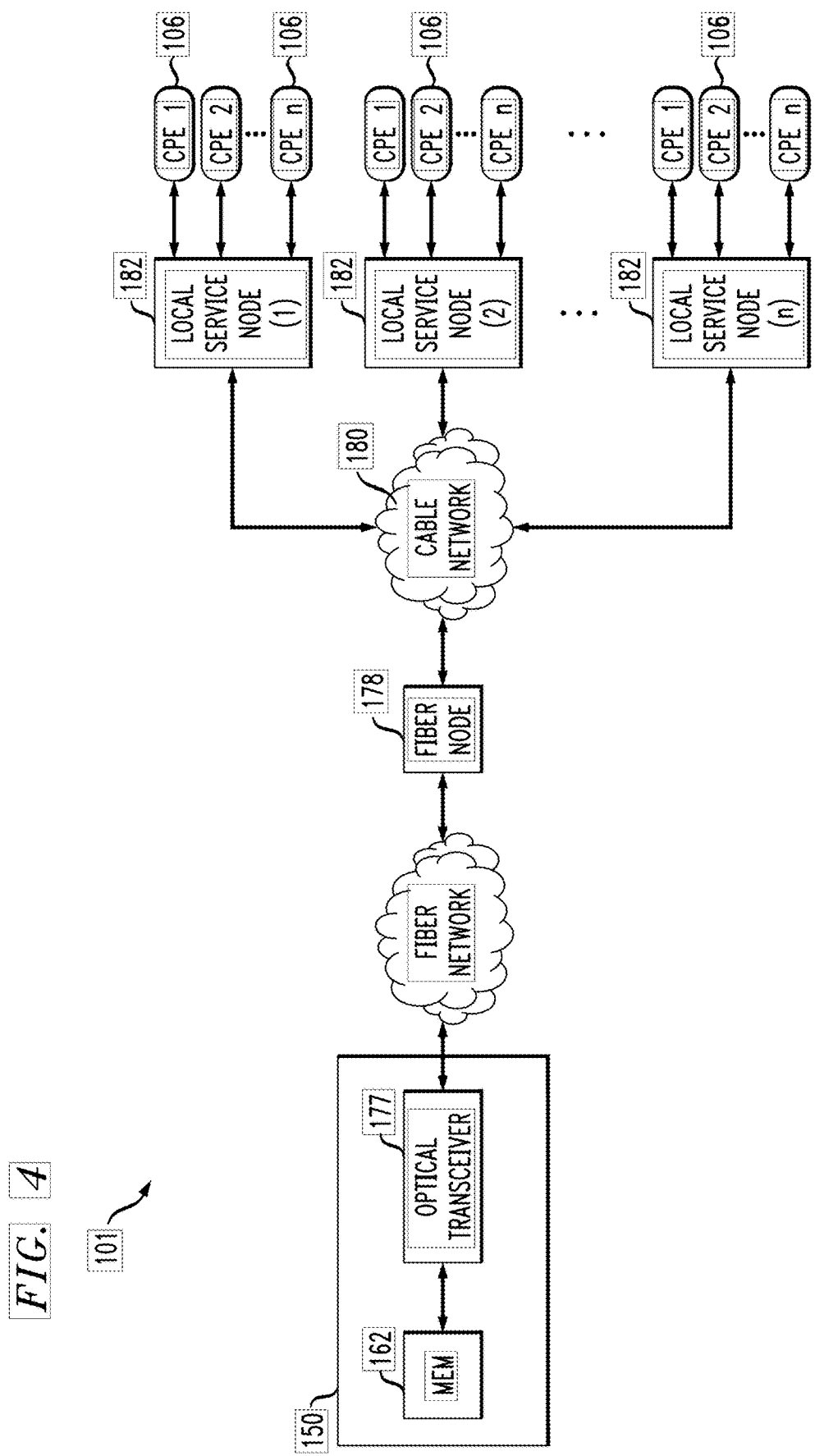
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network 179 to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed. It should be understood that embodiments of the invention have broad applicability to a variety of different types of networks. Some embodiments relate to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
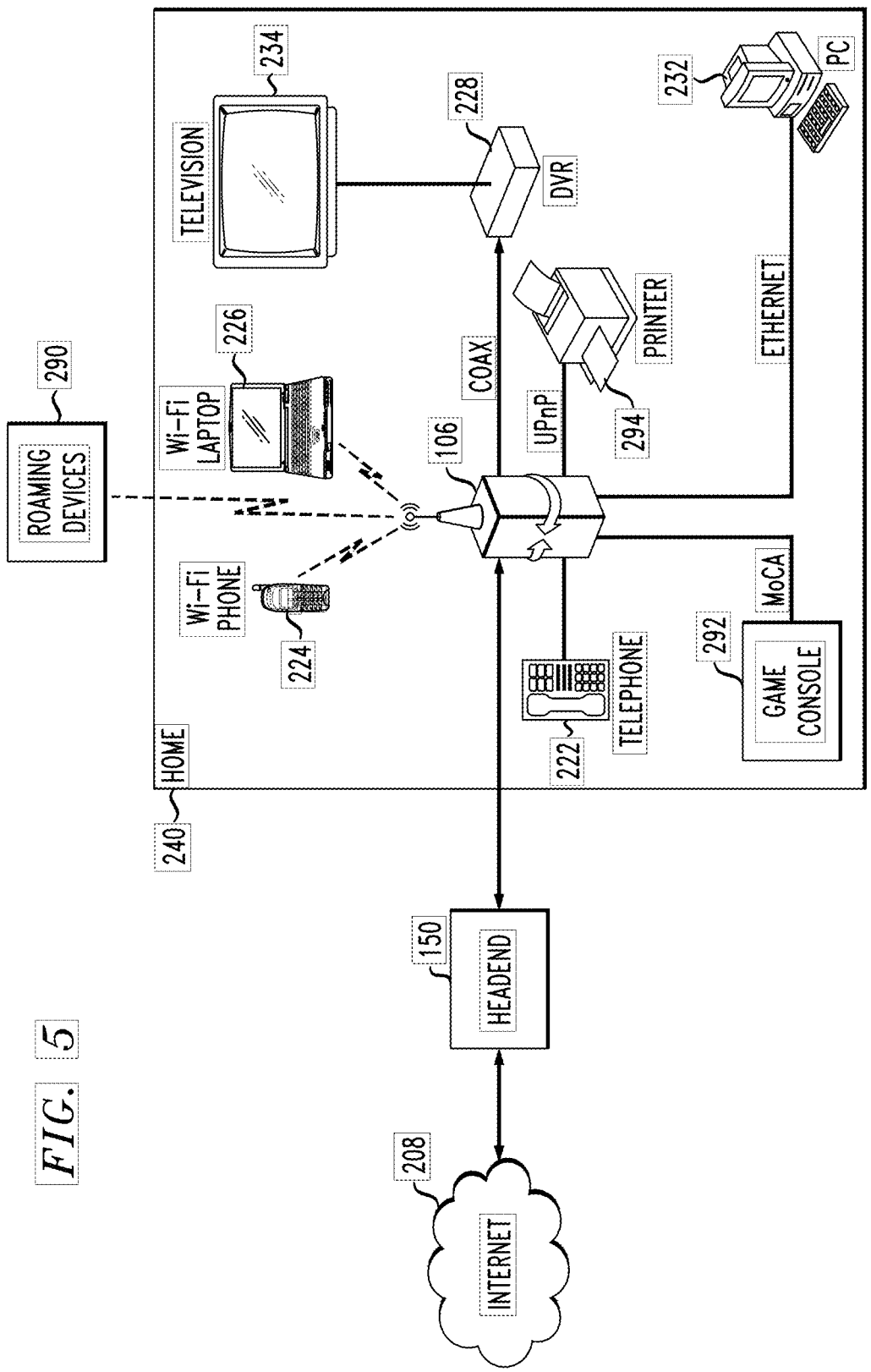
FIG. 5 is a functional block diagram of a premises network, including an exemplary centralized customer premises equipment (CPE) unit, interfacing with a head end such as that of FIG. 3.
Figure 6:
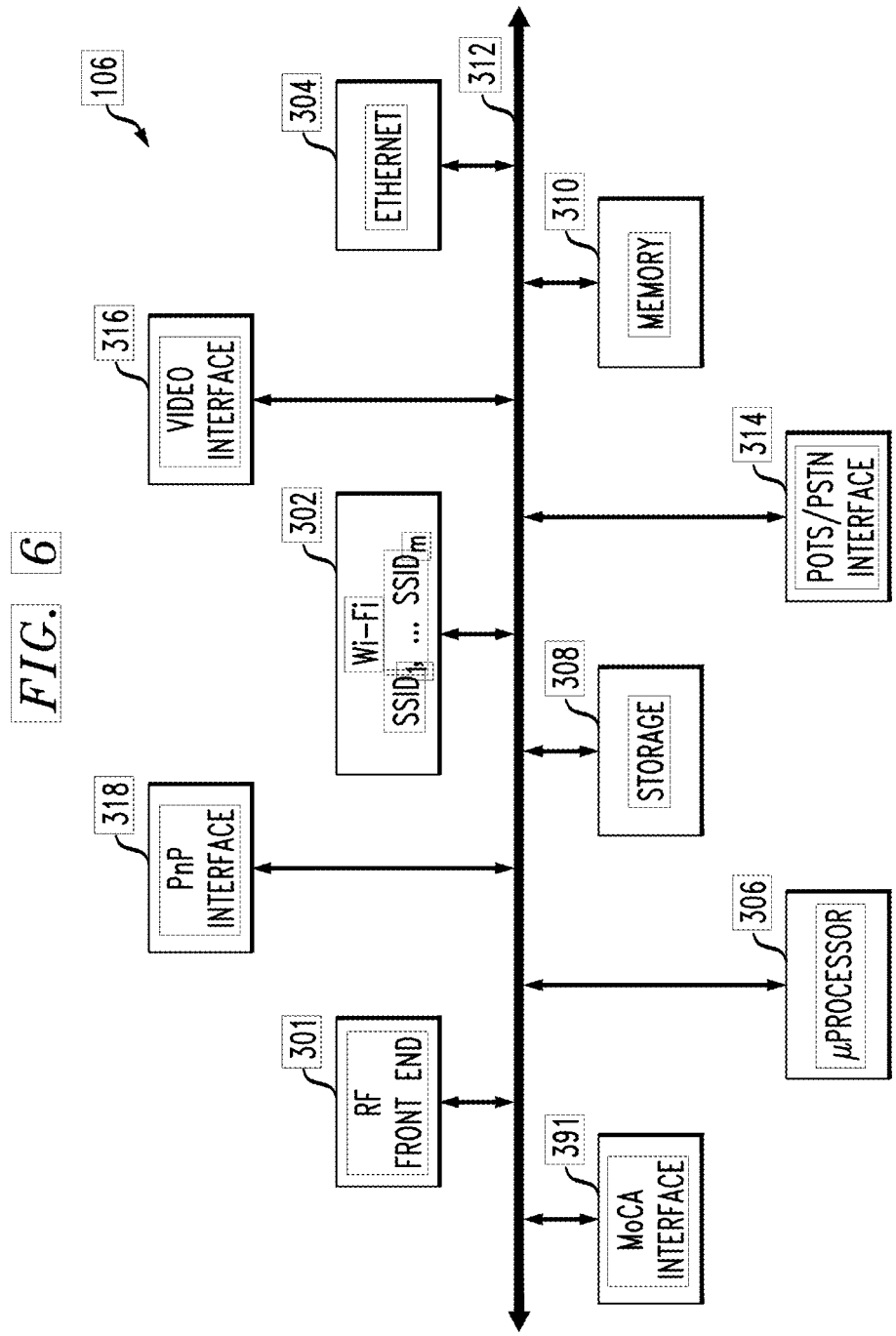
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example, over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random-access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g., the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g., Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
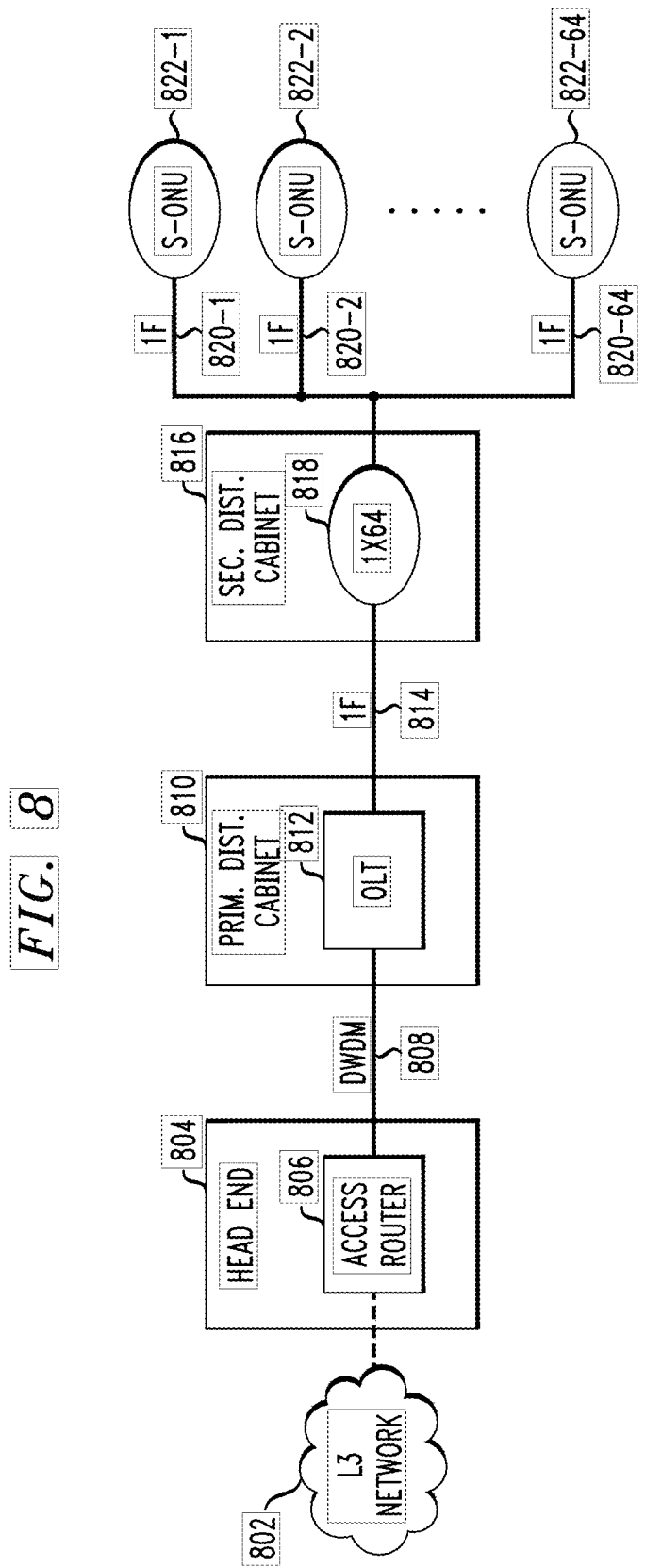
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 1802 generally represents the elements in FIG. 1 upstream of the head ends 150, while head end 1804, including access router 1806, is an alternative form of head end that can be used in lieu of or in addition to head ends 150 in one or more embodiments. Head end 1804 is suitable for FTTH implementations. Access router 1806 of head end 1804 is coupled to optical line terminal 1812 in primary distribution cabinet 1810 via dense wavelength division multiplexing (DWDM) network 1808. Single fiber coupling 1814 is then provided to a 1:64 splitter 1818 in secondary distribution cabinet 1816 which provides a 64:1 expansion to sixty-four S-ONUs 1822-1 through 1822-64 (in multiple premises) via sixty-four single fibers 1820-1 through 1820-64, it being understood that a different ratio splitter could be used in other embodiments and/or that not all of the 64 (or other number of) outlet ports are necessarily connected to an S-ONU.

Figure 9:
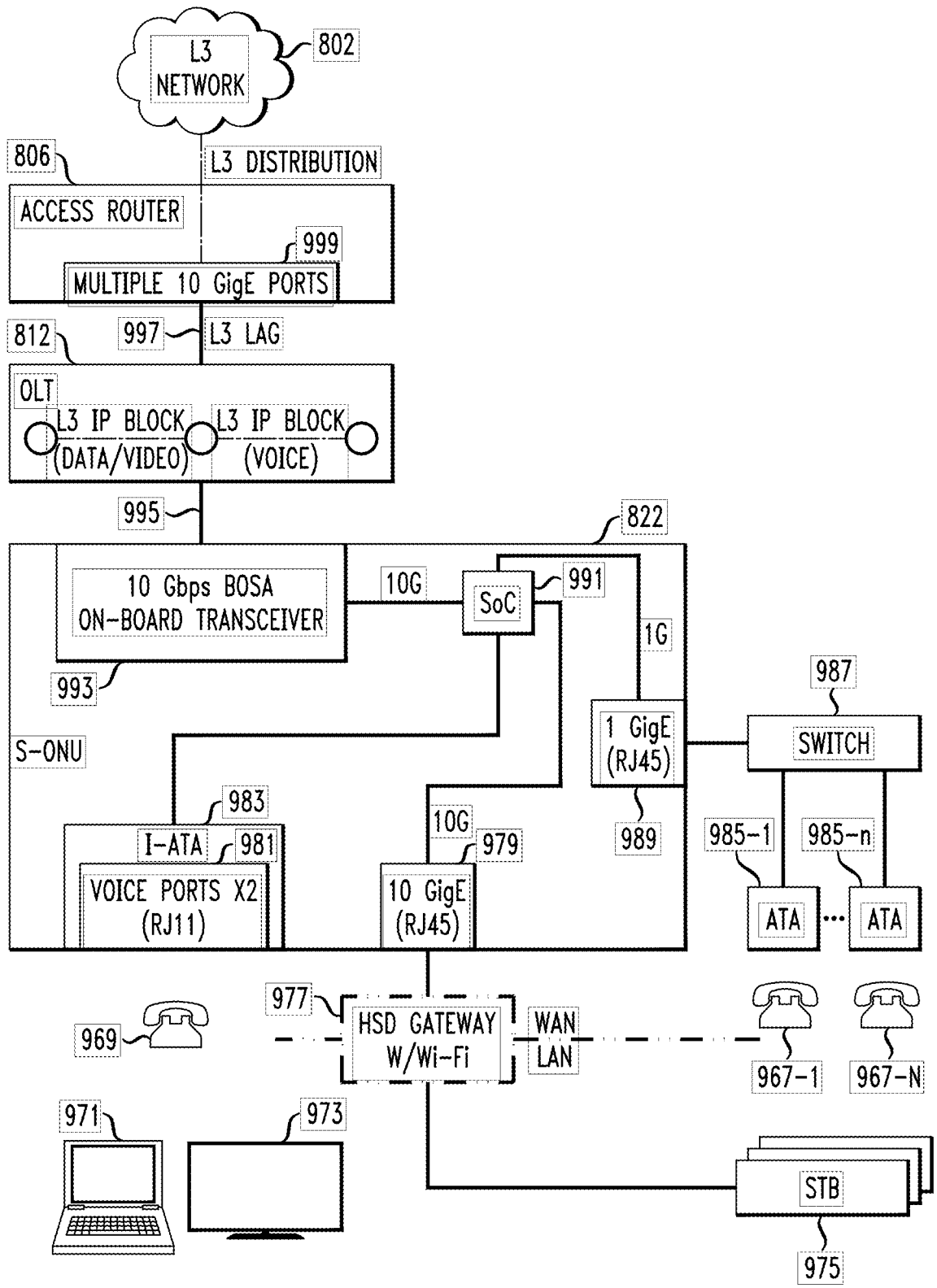
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 1806 is provided with multiple ten-Gigabit Ethernet ports 1999 and is coupled to OLT 1812 via L3 (layer 3) link aggregation group (LAG) 1997. OLT 1812 can include an L3 IP block for data and video, and another L3 IP block for voice, for example. In a non-limiting example, S-ONU 1822 includes a 10 Gbps bi-directional optical subassembly (BOSA) on-board transceiver 1993 with a 10G connection to system-on-chip (SoC) 1991. SoC 1991 is coupled to a 10 Gigabit Ethernet RJ45 port 1979, to which a high-speed data gateway 1977 with Wi-Fi capability is connected via category 5E cable. Gateway 1977 is coupled to one or more set-top boxes 1975 via category 5e, and effectively serves as a wide area network (WAN) to local area network (LAN) gateway. Wireless and/or wired connections can be provided to devices such as laptops 1971, televisions 1973, and the like, in a known manner. Appropriate telephonic capability can be provided. In a non-limiting example, residential customers are provided with an internal integrated voice gateway (I-ATA or internal analog telephone adapter) 1983 coupled to SoC 1991, with two RJ11 voice ports 1981 to which up to two analog telephones 1969 can be connected. Furthermore, in a non-limiting example, business customers are further provided with a 1 Gigabit Ethernet RJ45 port 1989 coupled to SoC 1991, to which switch 1987 is coupled via Category 5e cable. Switch 1987 provides connectivity for a desired number n (typically more than two) of analog telephones 1967-1 through 1967-n, suitable for the needs of the business, via external analog telephone adapters (ATAs) 1985-1 through 1985-n. The parameter "n" in FIG. 9 is not necessarily the same as the parameter "n" in other figures, but rather generally represents a desired number of units. Connection 1995 can be, for example, via SMF (single-mode optical fiber).

In addition to "broadcast" content (e.g., video programming), the systems of FIGS. 1-6, 8, and 9 can, if desired, also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Principles of the present disclosure will be described herein in the context of apparatus, systems, and methods for insertion of modulated tones into a communications plant for leakage detection purposes, making radiation level measurements, and detecting RF leakage from the communications plant. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

Nodes are points in a network where the HFC network converts from an optical based signal transmission system to a radio-frequency (RF) based transmission system confined within a coaxial cable or other communications conduit. The nodes are typically located inside MSO facilities that house the equipment. According to some embodiments, leakage detection sites are moved beyond these sites, improving detection capabilities. In a Distributed Access Architecture (DAA), the nodes of the network become more commonly deployed toward end users (e.g., groups of homes and businesses), away from the MSO facilities. According to some embodiments of the present invention, receivers positioned within these nodes enable the reception of leakage signals, or tones, output by equipment such as cable modems disposed at end user premises. According to one or more embodiments of the present invention, triangulation of RF leakage is possible based on propagation models, with knowledge of the nodes' geographical positions, which are typically spaced thousands of feet apart.

According to some embodiments, nodes are embodied as mini-CMTS devices, serving hundreds of customers, wireless 5G CBRS (Citizens Broadband Radio Service) devices, MDUs (Multiple Dwelling Units), etc. According to one or more embodiments, the nodes are typically strung in the HFC network.

Embodiments of the present invention improve on conventional detection methods. The detection of cable plant leakage can be difficult due to low-level signals in the downstream band, and/or high-power signals in the upstream band. The conventional detection methods rely on fixed frequency tones of a high frequency in combination with drive-by receiver equipment to locate a source of signal leakage.

Embodiments of the present invention aim to reduce or eliminate the need for manual, drive-by leakage detection. For example, according to some embodiments of the present invention, modulated tones having a repeating pattern are readily detected as negative carrier to noise ratios, where the background radio frequency noise is higher than the tones to be detected. Some embodiments of the present invention include detection and reporting processes for a machine-learning, automated system using asset locations to locate RF leakage from a network, using data about the locations of the nodes and mass-data aggregation of detection results generated by the nodes. Embodiments of the present invention make use of known node positions within the network to make the radiation level measurements. According to some embodiments, multiple measurements made across multiple nodes are aggregated and triangulated to determine a leakage level at an egress point and to locate a position of the egress point. According to one or more embodiments, a system assesses a normal background leakage level and finds any continuous or periodic leakage points of transmissions from a single modem or groups of modems transmitting tones according to a schedule.

Embodiments of the present invention make use of modulated tones for leakage detection purposes, where the tone is generated by a modem, a node, etc., on a time scheduled basis such that the tone does not simultaneously exist across all of the network at the same time. In the case of the node, the tone is generated in a downstream path for a downstream band. According to some embodiments, the tone is enabled and disabled when needed for the purpose of leakage detection. This reduces the noise floor that would otherwise exist at an elevated level at any point in a network as the sum of all other egressing points. According to one or more embodiments, when a tone is enabled locally, then detection by proximate nodes equipped with leakage detection receivers can be used to triangulate the source of the egress.

According to at least one embodiment, modems and/or nodes can be enabled or disabled as tone generators and tone receivers (detectors), as needed, to strategically locate points of egress. Since the location of a point of egress is not known at the start, having the ability to search by enabling and disabling the tone node-by-node, and enabling and disabling some number of nodes as detections improves the ability to accurately locate the point of egress.

According to one or more embodiments, an aggregation of the detection data from across multiple nodes within the same region is reported to a centralized computer, e.g., a scheduler. According to one or more embodiments, an aggregation of the detection data from across multiple nodes within the same region is collected by a compute-capable node within any of the nodes, or to an application distributed across a number of the nodes.

According to some embodiments, a compute-capable node is configured to convert optical signals to electric signals communicated over coaxial cable. For example, a compute-capable node can receive IP traffic over an optical fiber, process the traffic packet-by-packet, converting to a DOCSIS-IP format communicated over an electrical coaxial cable.

According to some embodiments, the nodes can employ a CPU in the middle approach for the purpose of packet switching, IP header filtering, security monitoring, etc. The compute function allows other applications to run inside the node, such as RF detection algorithms from leakage detection antenna-receivers at the node. The CPUs of the nodes are high-capacity devices with local memory (e.g., Flexible MAC Architecture (FMA)/DAA architectures) supporting containerized applications, such as leakage detection firmware.

Embodiments of the present invention make use of amplitude varying carriers, referred to as tones, inserted into the HFC spectrum, where the characteristics of the carriers enable the reception of many more levels than current fixed carrier methods.

Figure 10:
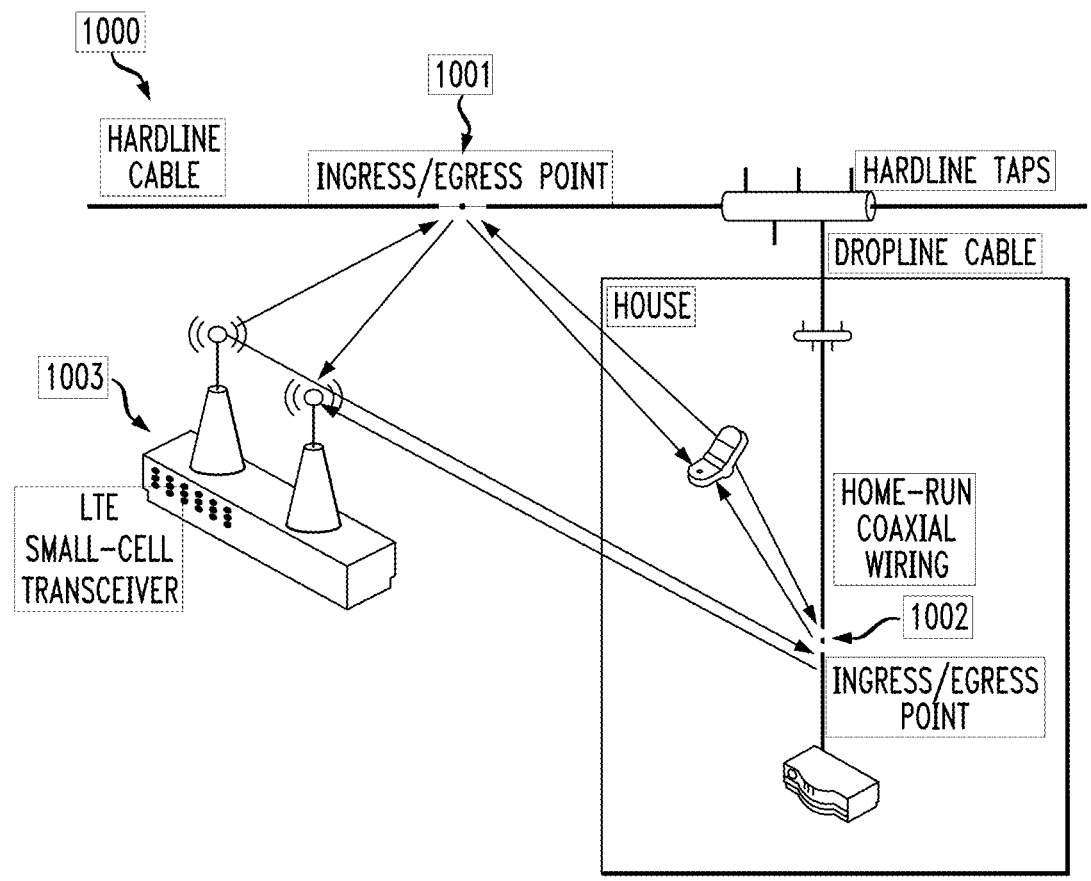
FIG. 10 is a diagram of a network having potential ingress and egress points.

Referring to FIG. 10, RF leakage from an HFC plant infrastructure 1000 can occur at any point within a network system, including from within a customer's premises. An egress/ingress point for RF leakage can be at any point in the network system (e.g., 1001, 1002), including from equipment and connection points. Interference with mobile radio systems, such as LTE cellular service providers, can occur when an egress point in the network becomes a transmitter into a local environment. For example, in a case where the cable signals carried by the network operate at the same frequencies as those used by a 4G-LTE cellular system (e.g., operating around 650, 750, 850 and 950 MHz) and leak from the egress point, the signals may interfere with the mobile radio signals. Such interference can occur at other frequencies, such as the civil aviation communications band of 108-137 MHz.

FIG. 10 shows a LTE-small cell receiver 1003 disposed for detection of RF leakage from the ingress/egress points. The LTE-small cell receiver 1003 can be replaced by another device, such as (for example) a DOCSIS node with omni-directional antennas, or the like, configured to detect RF leakage.

Regarding ingress, in many cases an ingressing signal (e.g., a signal entering the cable plant through a defect in the communications infrastructure) will come from a single fixed-location source. Multi-pole detections by RF receivers on nodes enable triangulation of that source. Identification can be accomplished by pattern recognition tools, for example, which determine if the ingressing signal is a radio signal (i.e., voice AM/FM), an off-air video broadcast, cellular base station, mobile CB or HAM radio, or another signal. According to some embodiments, ingressing data from located sources can be used to infer a leak point in the plant.

It should be understood that practically every piece of equipment within the network system (e.g., a cable plant network) represents a potential RF radiator. The types of equipment disposed within the system can be divided by physical location into outdoor plant equipment and indoor consumer premises equipment. Within both of these categories of equipment are different types of coaxial cable and equipment. The outdoor plant equipment includes, for example, nodes, hardline coaxial cable and connectors, amplifiers, taps, drop coaxial cable and connectors, filters or traps, power supplies, power insertors, outdoor cable modems, etc. The indoor consumer premise equipment includes, for example, home-run coaxial cable and connectors, amplifiers, splitters, filters (channel/band and MoCA), high-speed data cable modems, advanced wireless gateways, set-top boxes (analog/digital, DVR, non-DVR, DTA's), etc. All of the equipment has a designed-in level of shielding effectiveness, which can vary due environmental conditions or ageing effects.

According to one or more embodiments of the present invention, a method for improved detection of RF leakage from a network system makes use of an inserted tone with known characteristics that improve detectability and detection range.

According to some embodiments, an inserted tone is modulated at a low frequency, enabling detection at lower levels (i.e., lower amplitudes). According to some embodiments, tones with low frequencies, e.g., with a modulation pattern in the low kilohertz (kHz) range, are more easily detected relative to a noise floor than a high frequency tone. Shannon's Law describes the information capacity for various bandwidths and modulation rates, and defines a maximum efficiency for any channel as a resulting Bit-Error Rate (BER) versus a probability of accurate detection. High efficiency in a noisy environment, according to Shannon's Law, requires a higher-than-noise-floor Carrier-to-Noise Ratio (CNR). Typically, for a QAM256-based compressed video signal, this is about 33 dB for a BER of 1E-7. However, for leakage detection, reliability of information accuracy is not required. For example, a slow keying system such as Morse code operated at a modulation of a 5-10 Hz (Hertz) and can be transmitted at around 3-5 dB of CNR. However, if the inserted tone is modulated with a known repeating pattern, then, in the case where the tone is egressing, the probability of detection increases, and the tone can be reliably detected at a negative CNR. According to some embodiments, the modulated tone can be detected at a much longer range as compared to a fixed tone, where the background RF noise is greater than the tone to be detected.

According to at least one embodiment, a modulation sequence of the tone has a start time that is synchronized to a network grand-master clock, which is carried using Precision Timing Protocol (PTP), DOCSIS Precision Timing Protocol (DTP), IEEE1588v2, and SyncE. This allows for a synchronized start of the tone having the repeating pattern to nano-second accuracy. When triangulating a leakage point according to embodiments of the present invention, the pattern timing accuracy can be used to calculate a relative propagation delay between receivers, which improves the location accuracy.

According to one or more embodiments of the present invention, modulated tones are inserted into the cable plant, and detectors are deployed on nodes deployed deep into the field infrastructure where the detection distance is reduced, which improves the CNR and reliability of detection. According to some embodiments, a modulation scheme for the tone (e.g., a slowly repeating pattern) allows for improved detection ability.

When a tone with a given frequency, with or without a repeating pattern, is continuously transmitted across a cable plant, e.g., from a central signal generator, then the total radiation at that frequency increases across the entire plant. This effectively increases the noise floor at that frequency and reduces the ability to reliably detect leakage at any other specified point in the network. According to some embodiments of the present invention, the use of DAA nodes enables a node to support a tone signal generator and a detector at the same location. According to one or more embodiments, the tone can be locally enabled or disabled at each node, such that only a given branch of the network is transmitting the tone at some time, enabling nearby receivers to reliably detect the tone (i.e., RF leakage), since the receiver need not distinguish multiple tones radiating from different nodes with various phase changes (e.g., due to propagation delay).

It should be understood that a receiver (as generally used herein) is a device employed at an RF detection stage, and a detector is a device employed at a demodulation stage and/or the RF detection stage.

Figure 11:
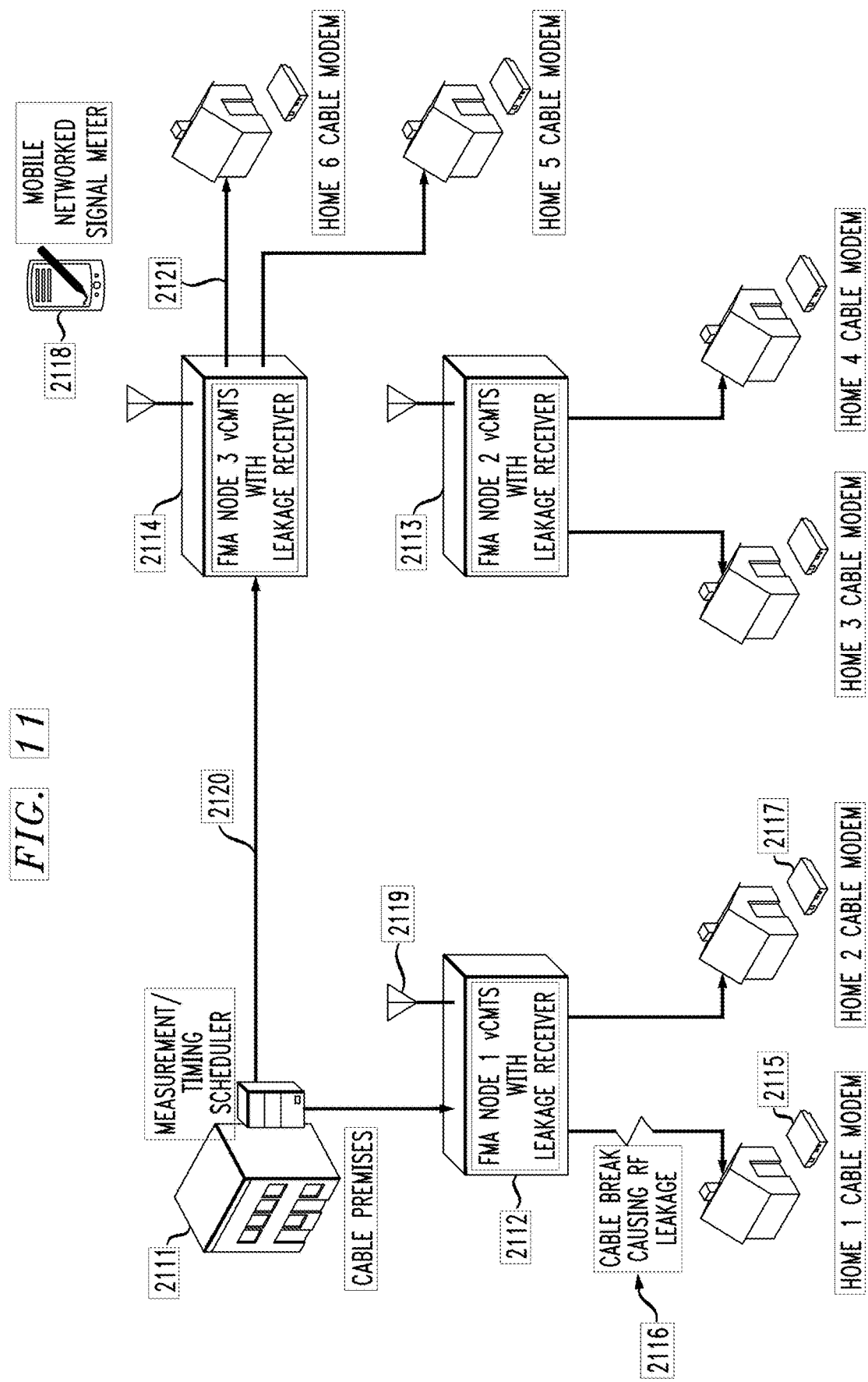
FIG. 11 is a diagram of a cable network plant in accordance with an example embodiment.

FIG. 11 is a diagram of a cable network in accordance with an example embodiment. As shown in FIG. 11, a cable plant including a scheduler 2111, and three Flexible MAC Architecture (FMA) nodes 2112, 2113, 2114 with leakage receivers. The network includes a plurality of cable modems, e.g., 2115, 2117, connected to each of the FMA nodes with leakage receivers. FIG. 11 illustrates a break in the cable 2116 causing RF leakage. Further, the network is configured to allow communication with wireless devices, such as a mobile networked signal meter 2118.

It should be understood that the FMA nodes are positioned relatively close to the modems, as compared to nodes disposed at a head-of-plant CMT type nodes. The FMA nodes typically service hundreds of modems and are strung in the network. According to some embodiments, the FMA nodes are configured as virtual or mini CMTS devices. According to some embodiments, wireless 5G CBRS (Citizens Broadband Radio Service) nodes are contemplated.

As a generalization, while the leakage detectors are shown at different node locations in FIG. 11, the leakage detectors can be located at any fixed location near the coaxial plant. In some cases, an antenna of the RF leakage detector is placed on an outside of a node's housing and detector circuitry is disposed in the node. According to some embodiments, the RF leakage detectors can be placed away from the nodes, while still on-plant.

In a case where the nodes can belong to overlapping service groups fed from different CMTS owned by different cable operators, some embodiments of the present invention enable separate detection of the correct cable modems using a modulation pattern or bit pattern that allows for location purposes and positive identification of a cable operators property.

According to at least one embodiment, a single modem tone ID allows detection by multiple nodes of leakage on a specific leaky piece of coax feeding a home. According to some embodiments, a main hardline leakage or a feeder branch leakage can be detected by aggregating data from multiple detections of groups of modems sharing that a same hardline, e.g., 2120 or branch 2121.

FIG. 12 shows a timing-synchronization method for RF leakage detection according to embodiments of the present invention. At 1201, the scheduler initializes a leakage probe method. At 1202, the scheduler probes modems connected to node 1 2112, wherein node 1 sequentially requests that each of the connected modems sends a tone. More particularly, at 1203 node 1 requests that modem 1 2115 send a tone. At 1204 the leakage detectors at each node listen for the tone. At 1205 each of the leakage detectors detects the tone (or not) and reports a detection result to the scheduler at 1206. The scheduler tabulates signal strength/direction data for modem 1 2115 at 1207. At 1208, node 1 requests that modem 2 2117 send a tone. At 1209 the leakage detectors at each node listen for the tone. At 1210 each of the leakage detectors detects the tone (or not) and reports a detection result to the scheduler at 1211. The scheduler tabulates signal strength/direction data for modem 2 at 1212.

According to at least one embodiment, methods described herein are extendable beyond fixed-location nodes, for example, in a case where mobile networked signal meters 2118 are carried by technicians. The mobile networked signal meters include GPS locators, such that leakage detection is geo-located. When included by a leakage detection scheduler 2111, the additional meters, e.g., 2118, add to the leakage-data collection scheme.

As shown in the synchronization diagram of FIG. 12, the scheduler, works on each node equipped with a leakage detector (e.g., 2112, 2113, 2114, 2118) in turn. Each node cycles through its connected modems in turn, requesting an upstream transmitted tone from each modem back to the node. The node then listens for leakage of this tone. According to at least one embodiment, simultaneously one or more (e.g., all) other nodes within range (e.g., a CMTS service group coverage area) are instructed to carry out the same detection operation of that particular tone. After all modems attached to a node have been cycled through, the scheduler moves onto the next node, which repeats the process for the modems attached to it.

According to one or more embodiments, the scheduling is performed by the CMTS devices 2112-2114. For FMA/DAA nodes, a CMTS is located in a node, and the scheduler can be part of the node's firmware. According to some embodiments, a scheduler asks each attached modem in a node's service group to transmit the tone in a round-robin fashion. In a case where a traditional iCMTS (integrated CMTS) is used at the head-of-plant, the firmware includes a scheduler, and the node is a "dumb" node in the topology.

According to one or more embodiments, the system includes a high-level scheduler 2111. The high-level scheduler 2111 coordinates the CMTS devices 2112-2114 (e.g., determining an order in which the CMTS devices perform tone insertion and tone detection operations). The coordination prevents any tones that cross over to adjacent CMTS service group coverage areas from being mis-detected. According to some embodiments, the high-level scheduler 2111 prevents any two nodes or CMTS devices from emitting a signal with tones at the same time, which could make leakage detection difficult. According to some embodiments, the high-level scheduler is a parent scheduler, and the node/CMTS schedulers are child devices.

FIG. 13 shows a flow diagram of method 1300 for RF leakage detection according to embodiments of the present invention. At 1311, the scheduler initializes a leakage probe method, which includes providing the nodes information about the tone to be used; for example, the frequency of the tone and the time when the nodes are to listen for the tone. At 1312, the scheduler instructs a first modem to generate the tone. At 1313 the leakage detectors at each node begin listening for the tone according to the information about the tone. At 1314 one or more of the leakage detectors detect the tone, determine a relative direction for the detection and measure a signal strength of the tone. At 1315 the nodes report a detection result to the scheduler. The scheduler tabulates signal strength and direction data received from the nodes and determines an approximate location of the RF leakage at 1316. According to some embodiments, the approximate location of the RF leakage is used in guiding or dispatching a technician to an egress point of the leakage, where the egress point is repaired 1317.

According to one or more embodiments, the scheduler provides the nodes with information about the tone, including the tone's frequency and when the tone is to be generated by each modem.

According to some embodiments, one or more of the nodes coordinate directly with one another. According to at least one embodiment, the coordination of the nodes is controlled by the scheduler. According to at least one embodiment, one or more of the nodes is equipped with an omnidirectional antenna 2119, enabling accurate determination of direction data for detected RF leakage and enabling triangulation of any detected RF leakage by the scheduler. For example, data about the direction of RF leakage can be transmitted to the scheduler, which uses information received from a plurality of nodes to calculate a location for any detected leakage using triangulation.

Upon completion of a cycle, the nodes have generated a signal strength table of a leakage figure for the cable path (modem to node) for every cable modem tested. According to some embodiments, the process builds a plant leakage map, path by path.

According to some embodiments, the scheduler instructs modems that a test is needed, causing the modems to generate a tone. The nodes are instructed to start looking for the tone. Their receivers go active, looking for the specific tone frequency. Then, upon detection, measure signal strength. The scheduler collects all the information for the test, and triangulates the RF leakage.

According to some embodiments, each tone is a recognizable (pre-amble) signature, enabling two or more modems to transmit respective tones simultaneously, which are uniquely identifiable and associated with leakage in their path(s) back to the node. A simultaneous operation advantageously speeds the leakage detection process. The pre-amble signature is pattern (e.g., 1's and 0's) that can be used to identify a source of a leaked signal. The pre-amble signature, e.g., 101010101, can be used to establish a timing/phase synchronization with a receiver/detector. Other patterns can translate to, colloquially, "This is Node 1" or "This is Cable Modem 2." Other patterns can translate to "This is Cable Modem 1 using Tone 5." One of ordinary skill in the art would appreciate, in view of the present disclosure, that various identifiers and information can be conveyed by the pre-amble.

According to some embodiments, a cable plant map contains the geographic locations of all nodes and the coaxial runs from all homes to nodes in the system. According to at least one embodiment, this information is used in determining an approximate triangulation of RF leakage and increases a probability of accurate leakage position detection.

According to one or more embodiments, in a case where a coaxial plant map is not available, a form of radio direction finding can be used; for example, using one or more directional antennas of the mobile networked signal meters 2118.

According to some embodiments, a location of the mobile networked signal meters 2118 is determined using the Global Positioning System (GPS), or the like, to achieve location-stamping.

Recapitulation

Given the discussion thus far, it will be appreciated that, in general terms, an exemplary method, according to an aspect of the invention, includes the step of initializing a leakage probe by providing information about a tone to a plurality of nodes of a network 1311, instructing a first modem connected to a first one of the nodes to generate the tone 1312, instructing a set of the nodes to listen for the tone outside of the network according to the information about the tone 1313, receiving, from the set of nodes, information about a plurality of detections of the tone outside of the network associated with a leakage of the tone from the network 1315, and determining a location of the leakage of the tone from the network using the information about the detections of the tone 1316.

According to some embodiments, a method for signal leakage detection comprises initializing a leakage probe by providing information about a tone to a plurality of nodes of a network 1311; instructing a first modem connected to a first one of the nodes to generate the tone 1312; instructing a set of the nodes to listen for the tone outside of the network according to the information about the tone 1313; receiving, from at least a detecting node of the set of nodes, information about the tone detected outside of the network associated with a leakage of the tone from the network 1315; and determining information about the leakage of the tone from the network using the information about the tone detected 1316.

According to some embodiments, a system comprises a cable premises 2111; a plurality of nodes, e.g., 2114, connected to the cable premises by a plurality of mainlines, e.g., 2120, the nodes comprising a leakage receiver 2119; and a plurality of modems, e.g., 2115, connected to each of the plurality of nodes by a plurality of branches 2121, wherein each of the nodes includes firmware having a scheduler configured to control the modems connected to respective ones of the branches to generate a modulated tone, and wherein the scheduler is configured to control the nodes to detect leakage of the modulated tone using the leakage receivers.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine-readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 7:
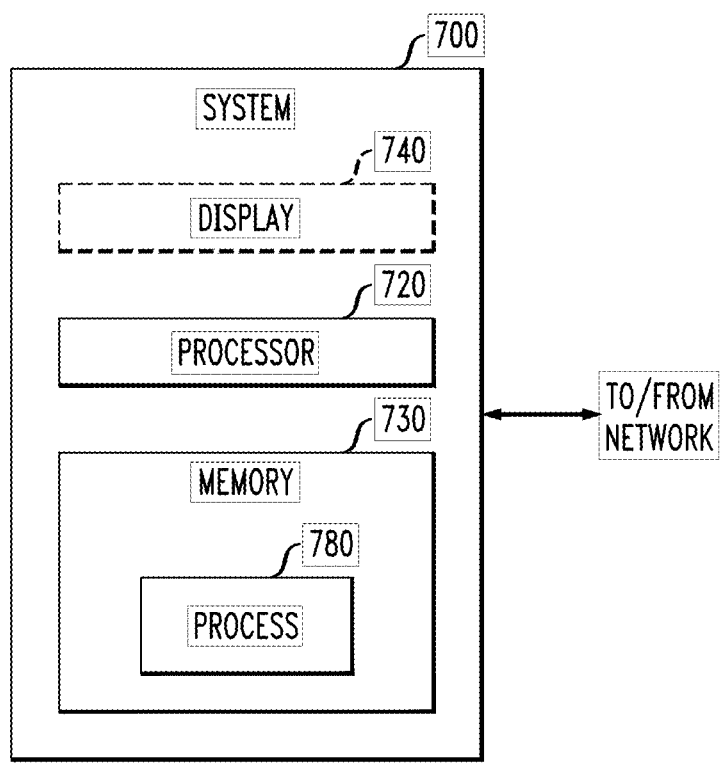
FIG. 7 is a block diagram of a computer system useful in connection with one or more aspects of the invention.

FIG. 7 is a block diagram of at least a portion of an exemplary system 700 that can be configured to implement at least some aspects of the invention, and is representative, for example, of one or more of the apparatus or modules shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for signal leakage detection comprising:
   initializing a leakage probe by providing information about a tone to a plurality of nodes of a network;
   instructing a first modem connected to a first one of the nodes to generate the tone;
   instructing a set of the nodes to listen for the tone outside of the network according to the information about the tone;
   receiving, from at least a detecting node of the set of nodes, information about the tone detected outside of the network associated with a leakage of the tone from the network; and
   determining information about the leakage of the tone from the network using the information about the tone detected.

2. The method of claim 1, wherein the information about the tone detected is received from a plurality of detecting nodes, including the detecting node, of the set of nodes.

3. The method of claim 2, wherein the information about the tone includes a relative direction for location from each of the detecting nodes and a measure of a signal strength of the tone at each of the detecting nodes.

4. The method of claim 2, wherein determining the information comprises determining a location of the leakage by a triangulation of the tone from the network using the information about the detections of the tone received from the plurality of detecting nodes.

5. The method of claim 1, wherein method is performed by a scheduler embodied in a firmware of the first one of the nodes.

6. The method of claim 1, wherein the information about the tone comprises a frequency of the tone and a time when the set of nodes are to listen for the tone.

7. The method of claim 1, further comprising a high-level scheduler coordinating the plurality of nodes.

8. The method of claim 1, wherein the information about the leakage includes an estimate of range to the leakage from the detecting node.

9. The method of claim 1, further comprising scheduling a plurality of modems, including the first modem, to transmit the tone at a plurality of respective times.

10. The method of claim 1, further comprising:
    dispatching a technician to an egress point of the leakage based on the information about the leakage of the tone from the network; and
    repairing the egress point.

11. The method of claim 1, further comprising modulating the tone according to a modulation pattern.

12. The method of claim 1, further comprising identifying the tone as distinguishing a cable operator of the network.

13. A method for signal leakage detection comprising:
    initializing a leakage probe by providing information about a tone to a plurality of nodes of a network;
    instructing a first modem connected to a first one of the nodes to generate the tone;
    instructing a set of the nodes to listen for the tone outside of the network according to the information about the tone;
    receiving, from the set of nodes, information about a plurality of detections of the tone outside of the network associated with a leakage of the tone from the network; and
    determining a location of the leakage of the tone from the network using the information about the detections of the tone.

14. The method of claim 13, wherein the information about a plurality of detections of the tone includes a relative direction for location from each node and a measure of a signal strength of the tone at each node.

15. The method of claim 14, wherein determining the location of the leakage includes triangulating the location of the tone using the information about the detections of the tone.

16. The method of claim 15, wherein the information about the leakage includes an estimate of range to the leakage from the detecting node.

17. The method of claim 13, wherein method is performed by a scheduler.

18. The method of claim 13, wherein the network information about the tone comprises a frequency of the tone and a time when the set of nodes are to listen for the tone.

19. The method of claim 13, further comprising:
dispatching a technician to an egress point of the leakage based on the location of the leakage of the tone from the network; and
repairing the egress point.

20. The method of claim 13, further comprising modulating the tone according to a modulation pattern.

21. The method of claim 13, further comprising identifying the tone as distinguishing a cable operator of the network.

22. A system comprising:
a cable premises;
a plurality of nodes connected to the cable premises by a plurality of mainlines, the nodes comprising a leakage antenna-receiver; and
a plurality of modems connected to each of the plurality of nodes by a plurality of branches,
wherein the cable premises, the nodes, the modems, the mainlines, and the branches comprise a network;
wherein each of the nodes includes firmware having a scheduler configured to control the modems connected to respective ones of the branches to generate a modulated tone, and
wherein each of the schedulers is configured to control the nodes to detect leakage of the modulated tone using the leakage antenna-receivers by performing method steps comprising:
initializing a leakage probe by providing information about the modulated tone to the nodes of the network;
instructing a first modem connected to a respective one of the nodes to generate the modulated tone;
instructing a set of the nodes to listen for the modulated tone outside of the network according to the information about the tone;
receiving, from at least a detecting node of the set of nodes, information about the modulated tone detected outside of the network associated with a leakage of the tone from the network; and
determining information about the leakage of the tone from the network using the information about the modulated tone detected.

23. The system of claim 22, wherein the cable premises comprise a parent scheduler configured to coordinate the schedulers of the nodes controlling the modems.

24. The system of claim 22, wherein the leakage antenna-receiver of at least one of the nodes is an omnidirectional antenna, and the at least one of the nodes is configured to determine direction data for detected leakage of the modulated tone.

25. The system of claim 22, further comprising a mobile networked signal meter.

26. The system of claim 25, wherein the mobile networked signal meter includes a global position system.

* * * * *